US007826607B1

(12) United States Patent
de Carvalho Resende et al.

(10) Patent No.: US 7,826,607 B1
(45) Date of Patent: Nov. 2, 2010

(54) DEVICES, SYSTEMS, AND METHODS FOR MIGRATION SCHEDULING

(75) Inventors: Mauricio Guilherme de Carvalho Resende, Holmdel, NJ (US); Diogo Vieira Andrade, Piscataway, NJ (US)

(73) Assignee: AT & T Intellectual Property II, L.P., Reno, NV (US)

( * ) Notice: Subject to any disclaimer, the term of this patent is extended or adjusted under 35 U.S.C. 154(b) by 1247 days.

(21) Appl. No.: 11/397,766

(22) Filed: Apr. 4, 2006

(51) Int. Cl.
*H04M 7/00* (2006.01)

(52) U.S. Cl. .................. 379/225; 379/15.03
(58) Field of Classification Search .......... 379/198, 379/225, 231, 232, 234, 211.03, 211.02, 379/15.03
See application file for complete search history.

(56) References Cited

U.S. PATENT DOCUMENTS

| 2003/0192028 A1 | 10/2003 | Gusler |
| 2004/0111726 A1 | 6/2004 | Dilley |
| 2004/0146147 A1 | 7/2004 | Picard |

OTHER PUBLICATIONS

Andrade, "A Grasp for PBX Telephone Migration Scheduling", The Eighth INFORMS Telecommunications Conference, Apr. 1, 2006, 4 page(s), AT&T Corp.
Feo, Thomas A., et al., "A Probabilistic Heuristic for a Computationally Difficult Set Covering Problem", Operations Research Letters, Apr. 1, 1989, 67-71 page(s), vol. 8, No. 2, Elsevier Science Publishers.
Feo, Thomas A., et al., "Greedy Randomized Adaptive Search Procedures", Journal of Global Optimization, 6, Jan. 1, 1995, 109-134 page(s), Kluwer Academic Publishers.
Festa, Paola, et al., "Grasp: An Annotated Bibliography", C.C. Ribeiro and P. Hansen, Editors, Essays and Surveys in Metaheuristics, Jan. 1, 2002, 41 page(s), Kluwer Academic Publishers.
Hart, J. P., et al, "Semi-Greedy Heuristics: An Empirical Study", Operations Research Letters, Jul. 1, 1987, 107-114 page(s), vol. 6, No. 3, Elsevier Science Publishers.
Resende, Mauricio G. C., et al., "Greedy Randomized Adaptive Search Procedures", F. Glover And G. Kochenberger, Editors, Handbook of Metaheuristics, Jan. 1, 2003, 29 page(s), Kluwer Academic Publishers.

*Primary Examiner*—Olisa Anwah
(74) *Attorney, Agent, or Firm*—Akerman Senterfitt; Michael K. Dixon (57) ABSTRACT

Certain exemplary embodiments can comprise a method that can comprise automatically modifying a schedule of a transfer of a plurality of groups of units from a first system to a second system. The method can comprise performing one or more recursive neighborhood searches on the schedule. The schedule can be determined initially via iterative determinations of a next unit to be transferred as a unit with a relatively low determined value of an objective function.

15 Claims, 4 Drawing Sheets

DEVICES, SYSTEMS, AND METHODS FOR MIGRATION SCHEDULING

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can comprise a method that can comprise automatically modifying a schedule of a transfer of a plurality of groups of units from a first system to a second system. The method can comprise performing one or more recursive neighborhood searches on the schedule. The schedule can be determined initially via iterative determinations of a next unit to be transferred as a unit with a relatively low determined value of an objective function.

In certain exemplary embodiments, a private branch exchange (PBX) can allow users to share a number of outside lines. PBXes can have many features, such as call forwarding, call recording, call transfer, and/or voice messaging, etc.

Some PBX features can relate to defined groups of telephone numbers. PBX features can comprise, for example, multi-line hunt (MLH), call pickup (CPU), intercom (ICOM), series completion (SC), and/or shared telephone number (STN) groups, etc. An MLH group can comprise a cycle of telephone numbers. When a call is made to a telephone in the cycle and the call is not answered, the call can be transferred to a next telephone in the cycle. This can be repeated until someone picks up. A CPU group can be a set of telephone numbers where any telephone in the group can pickup a call made to any other telephone in group. Any telephone in an ICOM group can speed dial any other group member. A SC group can be an ordered list of telephone numbers. If a call made to a first telephone in the ordered list is not answered, the call can be transferred to a next telephone in the ordered list. The call can be iteratively transferred to a sequence of telephone numbers in the ordered list until someone picks up. If a last telephone in the ordered list does not pick up, a voice mail system can answer the call. An STN group can be a set of telephone numbers for which calls made to them can be answered by a single telephone (e.g. an assistant). In an enterprise there may exist several MLH, CPU, ICOM, SC, and STN groups and a single telephone number may be a member of more than one group.

A problem can arise when an enterprise acquires a new PBX to replace an existing one. Telephone numbers need to migrate from the existing PBX to the new PBX over a time horizon of T time periods. Each group, g, can be associated with a penalty $p_g$. In certain exemplary embodiments, $\phi(u) \in \{1, 2, \ldots, T\}$ can be a time period in which a telephone number u migrates. If two telephones u and v in group g migrate in time periods $\phi(u)$ and $\phi(v)$, respectively, then a penalty $p_g |\phi(u)-\phi(v)|$ can be incurred. In certain exemplary embodiments, telephone numbers to be migrated in a planning horizon can be $1, 2, \ldots, P$. In certain exemplary embodiments, during each time period at most $\rho$ telephones might be allowed to migrate per period and a feasible schedule exists such that $T \times \rho \geq P$.

In certain exemplary embodiments, a migration plan can be scheduled so that a total migration penalty is minimized. Minimization can involve assigning telephone numbers to time periods such that no more than $\rho$ telephones are assigned to a single period. This problem can be called a PBX telephone migration scheduling problem.

In certain exemplary embodiments, a GRASP, or greedy randomized adaptive search procedure, can find good PBX telephone migration schedules. GRASP can be a metaheuristic for combinatorial optimization that can be applied to a wide range of optimization problems. A GRASP can be a multi-start procedure, where each iteration comprises a construction procedure followed by a local search procedure. The construction procedure can produce a starting solution for the local search procedure. The starting solution can be constructed using a semi-greedy algorithm, i.e. a randomized greedy algorithm. Whereas in a greedy algorithm the next element to be added to the solution can be the best choice if one were to ignore the effects of adding future elements, in a semi-greedy algorithm a set of good choices can be determined, and an element can be selected at random from this set. A neighborhood of a feasible solution can be a set of solutions obtained by minimally perturbing the feasible solution. A perturbation, also called a move, depends on a structure of the feasible solution. Given the feasible solution, a local search procedure can examine a neighborhood of the feasible solution seeking a better-quality solution. If the better-quality solution is found, the local search can be recursively reapplied, starting from the better-quality solution. The local search procedure can end when no better-quality solution can be found in a neighborhood of a current solution, which can be referred to as a local optimum.

A feasible solution of the PBX telephone migration scheduling problem can be an assignment of telephone numbers to time periods such that each time period has no more than $\rho$ telephone numbers assigned to it.

The construction procedure can sequence a plurality of telephone numbers and assign them evenly to each time period of a plurality of time periods. In certain exemplary embodiments, $\pi(u)$ can be the position of telephone number u in a sequence of the plurality of telephone numbers. A first $\lceil P/T \rceil$ numbers in the sequence can be assigned to a first time period, a second $\lceil P/T \rceil$ numbers can be assigned to a second time period, and so on. A last time period might have less than $\lceil P/T \rceil$ numbers assigned to it. To describe the construction procedure, consider a graph $G=(V,E)$, where V is a set of telephone numbers and $(u,v) \in E$ if and only if there is a penalty associated with migrating telephone numbers u and v in different time periods. Since u and v can jointly belong to more than one group, there might be more than one penalty associated with moving telephone numbers u and v in different time periods. In certain exemplary embodiments, $w_{u,v}$ can be a per-period sum of penalties associated with moving telephone numbers u and v in different time periods. A goal of the construction procedure can be to generate a diverse set of good-quality solutions. In certain exemplary embodiments, an approximation of solution cost can be via a function $\Sigma_{(u,v) \in E} w_{u,v} |\pi(u)-\pi(v)|$. Solutions of the function with a relatively small value of the function can comprise pairs of numbers with high penalties sequenced close to each other.

In certain exemplary embodiments, if $k-1$ vertices have been already sequenced a next (k-th) vertex can be sequenced from a set $\Gamma$ of vertices yet to be sequenced. For $u \in \Gamma$, in certain exemplary embodiments $f(u)$ can be a penalty-weighted degree of u with respect to all $v \in \Gamma \setminus \{u\}$, i.e. $f(u)=\Sigma_{v \in \Gamma, \{u\}} w_{u,v}$. Likewise, for $u \in \Gamma$, in certain exemplary embodiments, b(u) can be a penalty-weighted degree of u with respect to all $v \in V \setminus \Gamma \setminus \{u\}$, i.e. $b(u)=\Sigma_{v \in V, \Gamma \{u\}} w_{u,v}$. A greedy choice for a next vertex can be one which minimizes f(u)−b(u). In certain exemplary embodiments, S can be a sum of weights ($\Sigma_{(u,v) \in E} w_{u,v}$ for $u \in V \setminus \Gamma$ and $v \in \Gamma$). By removing u from $\Gamma$, $\Delta S=f(u)-b(u)$. Therefore, by choosing a smallest value of f(u)−b(u), a remaining sum of weights can be minimized.

A greedy algorithm can proceed as follows. Initially, a set $\Gamma$ of yet to be sequenced vertices can be set to V. For all $v \in \Gamma$, b(v)=0 and $f(v)=\Sigma_{u \in \Gamma \setminus \{v\}} w_{v,u}$. A first vertex in a sequence, $v_i$, can be chosen as a vertex v having a smallest f(v) value. The first vertex can be removed from set $\Gamma$, i.e. $\Gamma=\Gamma \setminus \{v_1\}$. In certain exemplary embodiments, where k−1 vertices have been already sequenced and a next vertex, $v_k$ can be selected to sequence. First, values b(v) and f(v) for all $v \in \Gamma$ can be updated to take into account a selection of vertex $v_{k-1}$ in a previous iteration. For all $v \in \Gamma$, if $(v,v_{k-1}) \in E$ then $b(v)=b(v)+w_{v,v}{}^{k-1}$ and $f(v)=f(v)-f(v)-w_{v,v}{}^{k-1}$. Then $v_k=\text{argmin}_{v \in \Gamma}\{f(v)-b(v)\}$ can be chosen and removed from $\Gamma$, i.e. $\Gamma=\Gamma \setminus \{v_k\}$. In certain exemplary embodiments, the greedy algorithm can be repeated until n−1 vertices are sequenced and only a single vertex remains in set $\Gamma$. The remaining vertex can be the last vertex in the sequence. The GRASP construction can utilize a randomized version of the greedy construction described above. At each step of the construction, instead of selecting the vertex $v \in \Gamma$ with the smallest f(v)−b(v) value, a restricted candidate list made up of vertices $v \in \Gamma$ with small f(v)−b(v) values can be set up and a vertex can be chosen at random from a set of such small values.

Once a feasible solution is constructed, a local search can be applied to the feasible solution. The local search can comprise three neighborhood searches: swap telephones, move telephone, and swap periods. The swap telephones neighborhood search of assignment $\phi$ can be a set of all assignments $\phi'$ in which telephones u and v are in periods i and j, respectively, in $\phi$ and in periods j and i, respectively, in $\phi'$ and all other telephones have a same assignment in $\phi$ and $\phi'$. Such a move might not alter a size of any time period. The move telephone neighborhood search of assignment $\phi$ can be a set of all assignments $\phi'$ in which telephone u was in period i in $\phi$ and is in period j(j≠i) is $\phi'$ and all other telephones have the same assignment in $\phi$ and $\phi$ as long as $\phi'$ has no more than $\rho$ telephone numbers. A move in this neighborhood search can shrink time period i and increase time period j. Finally, the swap periods neighborhood search of assignment $\phi$ can be a set of all assignments $\phi'$ in which all telephones assigned to period i in $\phi$ are assigned to time period j(j≠i) in $\phi'$ and all telephones assigned to period j in $\phi'$ are assigned to time period i (i≠j) in $\phi$.

The local search can look for an improving assignment via the swap telephones neighborhood search. If the improving assignment is found, a move is made and the local search restarts. If no improving assignment is found, the local search proceeds to look for an improving assignment via the move telephone neighborhood search. If the improving assignment is found, a move is made and the local search restarts. If no improving assignment is found via the move telephone neighborhood search, the local search proceeds to look for an improving assignment via the swap periods neighborhood search. If the improving assignment is found, a move is made and the local search restarts. If no improving assignment is found via all three neighborhood searches, local search terminates with a locally optimal solution.

In an exemplary PBX telephone migration scheduling problem, an organization was selected that desired to migrate 2855 telephones in eight weeks. These telephones made up 223 groups (with as few as one telephone and at most 804 telephones per group). At most 375 telephones could be migrated in one week. The penalties for groups MLH, CPU, ICOM, SC, and STN were determined to be 10, 4, 3, 2, and 1, respectively.

Figure 1:
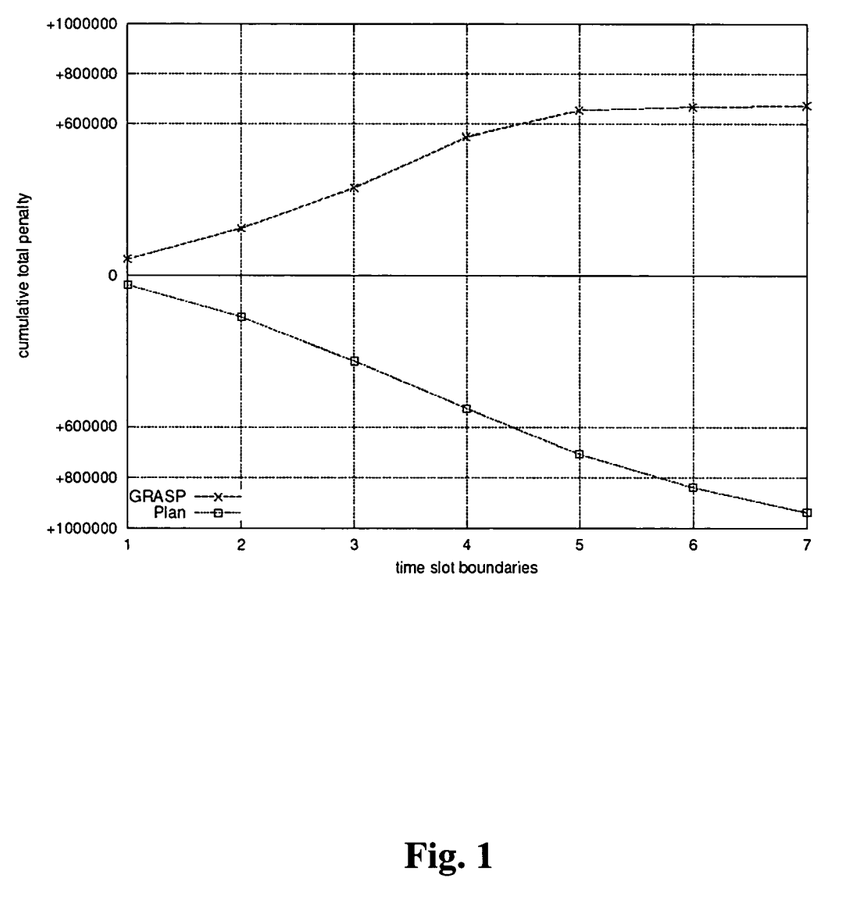
FIG. 1 is a graph comparing a solution produced with GRASP with a migration plan proposed by planners (Plan)

FIG. 1 is a graph comparing a solution produced with GRASP with a migration plan proposed by planners (Plan). To facilitate a visual comparison of the two solutions, the penalty for GRASP is shown above the axis while the penalty for the planner's solution is shown below the axis. The figure shows how penalties accumulate from time period one to time period seven. The GRASP reduced the total penalty by approximately 28%. The period sizes for the best solution found were 357, 367, 354, 374, 374, 374, 371, and 284.

Figure 2:
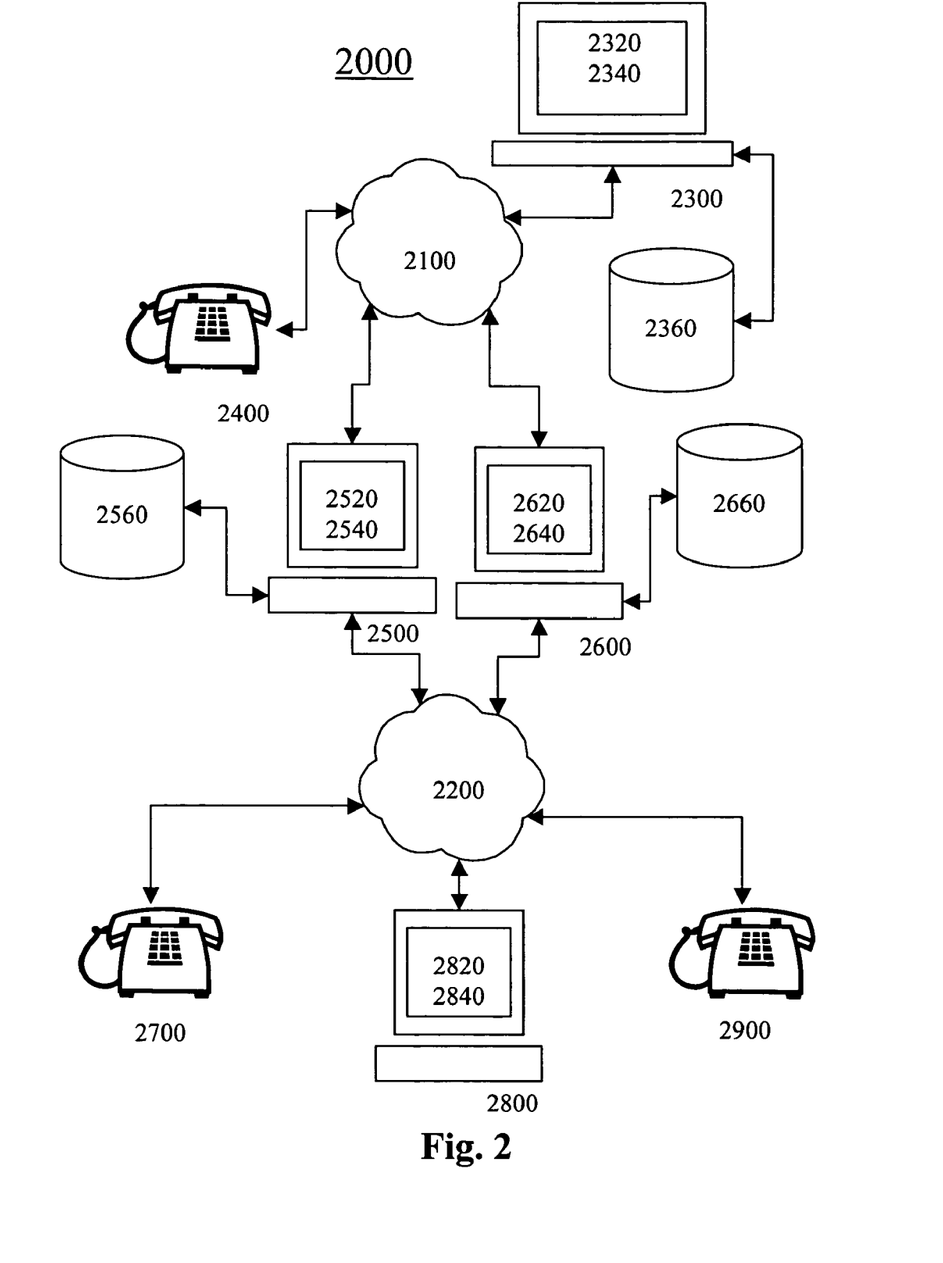
FIG. 2 is a block diagram of an exemplary embodiment of a system 2000.

FIG. 2 is a block diagram of an exemplary embodiment of a system 2000, which can comprise a first network 2100. In certain exemplary embodiments, first network 2100 can be a backbone network. A first information device 2300 can be communicatively coupled to additional information devices and or a first telecommunications unit 2400 via network 2100. First information device 2300 can comprise a user interface 2320 and a user program 2340. User program 2340 can be configured to provide an initial schedule and/or modify the initial schedule of migrations from a first system 2500 to a second system 2600.

In certain exemplary embodiments, first information device 2300 can comprise and/or be communicatively coupled to a memory device 2360. Memory device 2360 can be a machine-readable medium comprising machine instructions. The machine instructions can be for activities comprising automatically modifying a feasible schedule of a transfer of a plurality of groups of units from a first private branch exchange system to a second private branch exchange system. The modifying can be performed via one or more recursive neighborhood searches. The one or more recursive neighborhood searches can be performed on the feasible schedule. The transfer of each of the plurality of groups of units can be scheduled during a corresponding time period of a plurality of predetermined time periods. The feasible schedule can be initially determined via iterative determinations of a next unit to be transferred as a unit with a lowest determined value of an objective function f(u)−b(u), where:

$f(u)=\Sigma_{v \in \Gamma, \{u\}} w_{u,v}$;

$b(u)=\Sigma_{v \in V, \Gamma \{u\}} w_{u,v}$;

u is a unit;

v is a unit;

$w_{u,v}$ is a transfer penalty associated with transferring unit u in a first predetermined time period from the plurality of predetermined time periods and transferring unit v in second predetermined time period from the plurality of predetermined time periods;

V is a set of all units; and $\Gamma$ is a set of units yet to be scheduled.

In certain exemplary embodiments, information device 2300 can provide an electromagnetic signal comprising machine-interpretable instructions to one or more information devices via network 2100. The machine-interpretable instructions can be for automatically modifying a feasible schedule of a transfer of a plurality of groups of units from a first private branch exchange system to a second private branch exchange system. The modifying can be performed via one or more recursive neighborhood searches. The one or more recursive neighborhood searches can be performed on the feasible schedule. The transfer of each of the plurality of groups of units can be scheduled during a corresponding time period of a plurality of predetermined time periods. The feasible schedule can be initially determined via iterative determinations of a next unit to be transferred as a unit with a lowest determined value of an objective function f(u)−b(u),
where:
$f(u) = \Sigma_{v \in \Gamma, \{u\}} w_{u,v}$;
$b(u) = \Sigma_{v \in V, \Gamma\{u\}} w_{u,v}$;
u is a unit;
v is a unit;
$w_{u,v}$ is a transfer penalty associated with transferring unit u in a first predetermined time period from the plurality of predetermined time periods and transferring unit v in second predetermined time period from the plurality of predetermined time periods;
V is a set of all units; and
Γ is a set of units yet to be scheduled.

In certain exemplary embodiments, first system 2500 and/or second system 2600 can be PBX systems, local area network gateways, web servers, cellular telephone management devices, e-mail servers, and/or blog servers, etc. Each of first system 2500 and/or second system 2600 can be communicatively coupled via network 2100. First system 2500 can comprise and/or be communicatively coupled to a memory device 2560. Second system 2600 can comprise and/or be communicatively coupled to a memory device 2660. Each of memory device 2560 and memory device 2660 can comprise information specific to a plurality of units managed and/or served by first system 2500 and/or second system 2600. In certain exemplary embodiments, first system 2500 and/or second system 2600 can be information devices.

First system 2500 and/or second system 2600 can be communicatively coupled to a second network 2200. In certain exemplary embodiments, second network 2200 can be a local network configured to communicatively couple a plurality of units. For example, a second telecommunications unit 2700 and/or a third telecommunications unit 2900 can be communicatively coupled to each other and to other telecommunications units, such as first telecommunications unit 2400, via second network 2200 and/or first network 2100. A second information device 2800 can be communicatively coupled to first system 2500, second system 2600, second telecommunications unit 2700 and/or third telecommunications unit 2900 via network 2200. Second information device 2800 can comprise a user interface 2820 and/or a user program 2840. In certain exemplary embodiments, second information device 2800 can comprise a Voice Over Internet Protocol (VOIP) telecommunications unit (not illustrated). In certain exemplary embodiments, user program 2840 can be configured to communicatively couple the VOIP telecommunications unit to first telecommunications unit 2400. In certain exemplary embodiments, user program 2840 can be configured to provide an initial schedule and/or modify the initial schedule of a migration of units from first system 2500 to second system 2600.

Figure 3:
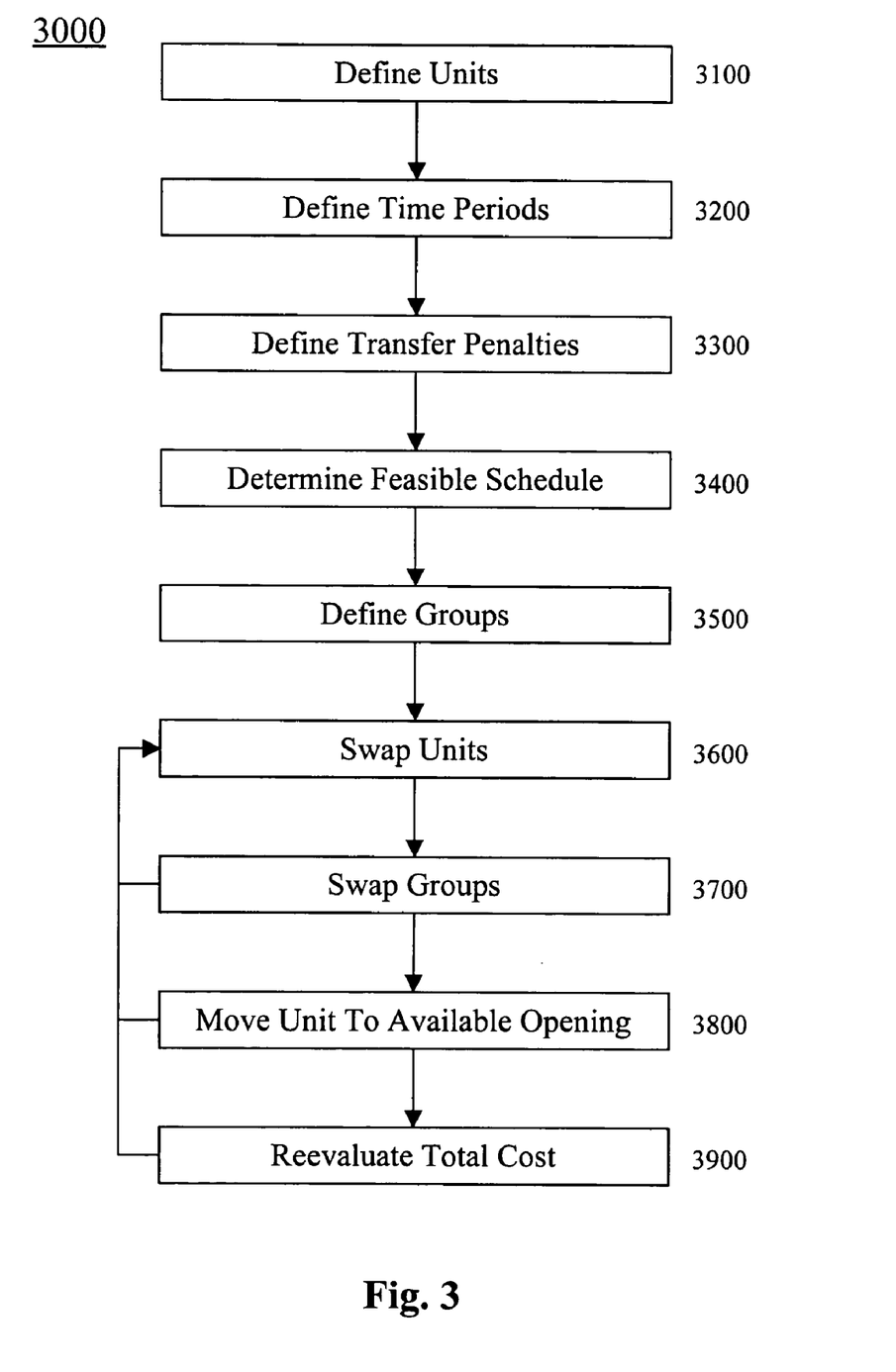
FIG. 3 is a flowchart of an exemplary embodiment of a method 3000.

FIG. 3 is a flowchart of an exemplary embodiment of a method 3000. At activity 3100, units can be defined. For example, each unit to be transferred from a first system to a second system can be identified, defined, and/or categorized, etc. For example, a management entity can define each of a plurality of units to be transferred from the first system to the second system. In certain exemplary embodiments, the first system and the second system can be office buildings, private branch exchange (PBX) systems, e-mail systems, cellular telephone systems, voicemail servers, VOIP servers, and/or network gateways, etc.

At activity 3200, a plurality of time periods can be defined for transferring units from the first system to the second system. In certain exemplary embodiments, the plurality of time periods can be of any defined duration such as one hour, six hours, eight hours, twelve hours, twenty four hours, thirty six hours, two days, four days, one week, two weeks, one year, and/or any value or subrange therebetween, etc. In certain exemplary embodiments, each of the plurality of time periods can have a same duration as other time periods of the plurality of time periods. In certain exemplary embodiments, each of the plurality of time periods can have a different duration from one or more other time periods of the plurality of time periods.

At activity 3300, a plurality of transfer penalties can be defined, derived, calculated, and/or determined, etc. In certain exemplary embodiments, the plurality of transfer penalties can be determined by an engineering entity and/or management entity. In certain exemplary embodiments, the plurality of transfer penalties can be automatically estimated based upon a plurality of relationships between units and/or ranks of units.

At activity 3400, a feasible schedule can be automatically obtained and/or automatically determined. In certain exemplary embodiments, the feasible schedule can be initially determined via iterative determinations of a next unit to be transferred as a unit with a lowest determined value of an objective function f(u)−b(u),
where:
$f(u) = \Sigma_{v \in \Gamma, \{u\}} w_{u,v}$;
$b(u) = \Sigma_{v \in V, \Gamma\{u\}} w_{u,v}$;
u is a unit;
v is a unit;
$w_{u,v}$ is a transfer penalty associated with transferring unit u in a first predetermined time period from the plurality of predetermined time periods and transferring unit v in second predetermined time period from the plurality of predetermined time periods;
V is a set of all units; and
Γ is a set of units yet to be scheduled.

In certain exemplary embodiments, the feasible schedule can be initially determined via a random selection of a next unit to be transferred from a plurality of potential units yet to be scheduled for transfer. Each of the potential units yet to be scheduled for transfer can have a comparable and/or relatively low calculated value of an objective function f(u)−b(u). For example, the relatively low calculated value can be below a predetermined threshold. The predetermined threshold can be empirically selected based upon magnitudes of transfer penalties.

At activity 3500, a plurality of groups can be identified and/or defined. Each of the plurality of groups can be characterized by a maximum number of units that can be migrated from the first system to the second system during a corresponding predetermined time period of the plurality of predetermined time periods. In certain exemplary embodiments, the maximum number of units assignable to each of the plurality of time periods can be defined, determined, obtained, and/or specified.

In certain exemplary embodiments, a total cost of the feasible schedule can be automatically obtained, determined, and/or calculated, etc. In certain exemplary embodiments, the feasible schedule of a transfer of the plurality of groups of units can be automatically modified. In certain exemplary embodiments, the feasible schedule can be for the transfer of the plurality of groups of units from the first system to the second system. The feasible schedule can be modified via a performance of one or more recursive neighborhood searches. In certain exemplary embodiments, one or more of three possible neighborhood searches associated with activities 3600, 3700, and/or 3800 can be performed.

At activity 3600, units can be swapped. For example, a modified schedule can be automatically determined via a reduction in a lowest calculated total penalty of a plurality of sequentially calculated total penalties as a result of sequential swaps of a predetermined unit from a group associated with an assigned time period with each other unit of the plurality of groups of units not assigned to the assigned time period. The lowest calculated total penalty can be calculated via activity 3900 each time a swap is performed. If a new lowest calculated total penalty is found, activity 3600 can be reexecuted from a starting point of a new schedule determined to result in the new lowest calculated total penalty.

At activity 3700, groups can be swapped. For example, a modified schedule can be automatically determined via a reduction in a lowest calculated total penalty of a plurality of sequentially calculated total penalties as a result of sequential swaps of a time period assignment of a first group of units with time period assignments of each other group of units of the plurality of groups of units. The lowest calculated total penalty can be calculated via activity 3900 each time a swap is performed. If a new lowest calculated total penalty is found, activity 3600 can be reexecuted from a starting point of a new schedule determined to result in the new lowest calculated total penalty.

At activity 3800, a particular unit can be swapped to one or more available time slots in one or more of the plurality of groups. For example, a modified schedule can be automatically determined via a reduction in a lowest calculated total penalty of a plurality of sequentially calculated total penalties as a result of sequential swaps of a predetermined unit from an assigned time period to any other available time period of the plurality of time periods. The lowest calculated total penalty can be calculated via activity 3900 each time a swap is performed. If a new lowest calculated total penalty is found, activity 3600 can be reexecuted from a starting point of a new schedule determined to result in the new lowest calculated total penalty.

At activity 3900, a total penalty of a migration of the plurality of units from the first system to the second system can be reevaluated. In certain exemplary embodiments, method 3000 can be terminated after a predetermined count of recursive neighborhood searches. In certain exemplary embodiments, method 3000 can be terminated when the calculated and/or recalculated total penalty is below a predetermined threshold. In certain exemplary embodiments, method 3000 can be terminated when a last recursive neighborhood search produces no improvement in a lowest calculated total penalty.

Figure 4:
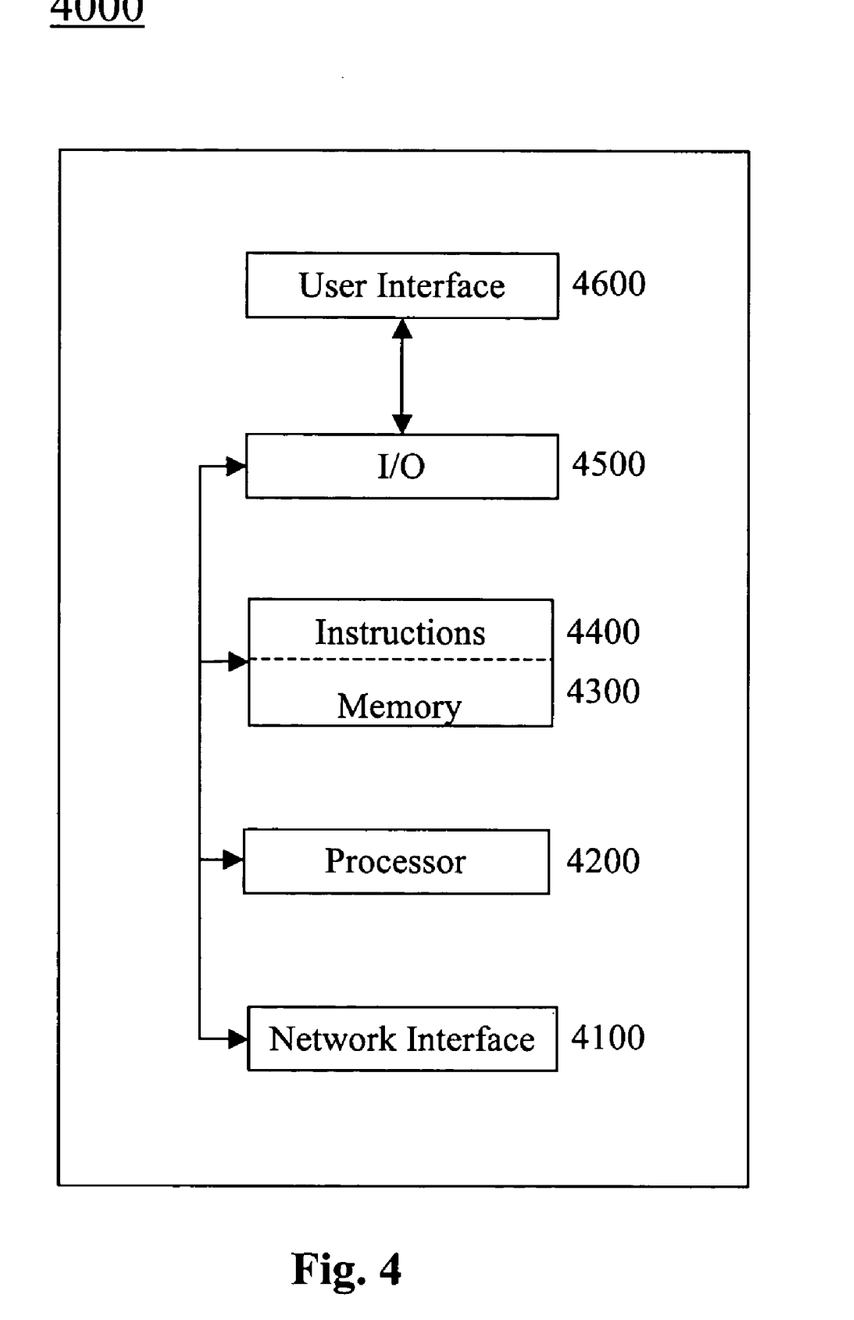
FIG. 4 is a block diagram of an exemplary embodiment of an information device 4000.

FIG. 4 is a block diagram of an exemplary embodiment of an information device 4000, which in certain operative embodiments can comprise, for example, first information device 2300, second information device 2800, first system 2500, and/or second system 2600 of FIG. 2. Information device 4000 can comprise any of numerous components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of information related to migration scheduling of units from a first system to a second system.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
achieve—to attain with effort.
activity—an action, act, step, and/or process or portion thereof.
adapted to—made suitable or fit for a specific use or situation.
and/or—either in conjunction with or in alternative to.
apparatus—an appliance or device for a particular purpose.
assign—to select and set apart for a particular purpose.
automatically—acting or operating in a manner essentially independent of external influence or control. For example, an automatic light switch can turn on upon "seeing" a person in its view, without the person manually operating the light switch.
backbone network—a "transit" network often made up of long-distance telephone trunk lines and/or other wired and/or wireless links such as microwave and satellite links for use in transmitting large amounts of data simultaneously between host computer systems connected to the Internet. Normal communicated data typically neither originates nor terminates in a backbone network.
based—being derived from.
calculate—to compute.
can—is capable of, in at least some embodiments.
chosen—selected from a number of possible alternatives.
comprising—including but not limited to.
corresponding—equivalent in quantity.
data—distinct pieces of information, usually formatted in a special or predetermined way and/or organized to express concepts.
define—to establish the outline, form, or structure of.
determination—an act of making or arriving at a decision.
determine—ascertain, obtain, and/or calculate.
device—a machine, manufacture, and/or collection thereof.
during—at some time in a time interval.
each—every one of a group considered individually.
electromagnetic—energy having a frequency within the electromagnetic spectrum and propagated as a periodic disturbance of the electromagnetic field when an electric charge oscillates or accelerates and/or one of the waves that are propagated by simultaneous periodic variations of electric and magnetic field intensity and that include radio waves, infrared, visible light, ultraviolet, X rays, and gamma rays.
feasible—capable of being done with means at hand and circumstances as they are.
group—a plurality of determined units.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

identify—to establish definitive characteristics of.

improvement—in a more desired state or condition.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initially—at a beginning.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

iterative—repeatedly.

lowest—smallest in magnitude.

machine instructions—directions adapted to cause a machine, such as an information device, to perform a particular operation or function. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

machine-interpretable—capable of being translated by an information device.

machine-readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

modify—to change.

neighborhood search—a test of one or more changes to variables associated with an objective function in an attempt to improve a result of the objective function.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

new—not previously determined.

next—immediately following, as in time, order, or sequence.

objective function—a calculable mathematical equation representing a total penalty associated with a schedule.

packet—a discrete instance of communication.

penalty—a weighting indicative of an estimated financial and/or non-financial cost of an action.

perform—to take action in accordance with one or more criterion.

plurality—the state of being plural and/or more than one.

predetermined—established in advance.

Private Branch eXchange (PBX) system—a telephone system within an enterprise that switches calls between enterprise users on local lines while allowing all users to share a certain number of external telephone lines.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

randomly—of or relating to an event in which possible outcomes are approximately equally likely.

recursive—determined via an algorithm that restarts each time a new local optimum is found.

reduction—a diminishment in magnitude.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

result—a consequence of a particular action, operation, or course.

schedule—(n.) a plan for performing work or achieving an objective.

schedule—(v.) to plan or appoint for a certain time or date.

sequentially—a in an ordered consecutive manner.

set—a related plurality.

signal—an indicator that serves as a means of communication and/or an impulse or fluctuating electric, magnetic, or optical quantity, such as voltage, current, field strength, intensity, etc., whose variations represent coded information.

store—to place, hold, and/or retain data, typically in a memory.

substantially—to a great extent or degree.

swap—to trade one thing for another.

system—a collection of mechanisms, devices, data, and/or instructions, the collection designed to perform one or more specific functions.

terminate—to end.

time periods—intervals of time of a defined duration.

total—of, relating to, or constituting a whole.

transfer—a conveyance of something from one state to another.

unit—something that has separate and distinct existence.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—an assigned or calculated numerical quantity.

via—by way of and/or utilizing.

where—in a situation or position.

yet—not thus far.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A method comprising:
    automatically modifying a feasible schedule of a transfer of a plurality of groups of telephone units from a first private branch exchange system to a second private branch exchange system, the modifying performed via at least one recursive neighborhood search, the at least one recursive neighborhood search performed on the feasible schedule, the transfer of each of the plurality of groups of telephone units scheduled during a corresponding time period of a plurality of predetermined time periods, the feasible schedule initially determined via iterative determinations of a next unit to be transferred as a unit with a lowest determined value of an objective function f(u)–b(u),
    where:
    $f(u) = \Sigma_{v \in \Gamma, \{u\}} w_{u,v}$;
    $b(u) = \Sigma_{v \in V, \Gamma, \{u\}} w_{u,v}$;
    u is a unit;
    v is a unit;
    $w_{u,v}$ is a transfer penalty associated with transferring unit u in a first predetermined time period from the plurality of predetermined time periods and transferring unit v in second predetermined time period from the plurality of predetermined time periods;
    V is a set of all telephone units; and
    Γ is a set of units yet to be scheduled.

2. The method of claim 1, further comprising:
   automatically obtaining the feasible schedule.

3. The method of claim 1, further comprising:
   automatically determining the feasible schedule.

4. The method of claim 1, further comprising:
   defining the plurality of time periods.

5. The method of claim 1, further comprising:
   defining each penalty of the plurality of penalties.

6. The method of claim 1, wherein the at least one recursive neighborhood search comprises:
   automatically determining a modified schedule of the transfer of the plurality of groups of telephone units from the first system to the second system, the determining of the modified schedule performed via a reduction in a lowest calculated total penalty of a plurality of sequentially calculated total penalties as a result of sequential swaps of a predetermined unit from a group associated with an assigned time period with each other unit of the plurality of groups of telephone units not assigned to the assigned time period.

7. The method of claim 1, wherein the at least one recursive neighborhood search comprises:
   automatically determining a modified schedule of the transfer of the plurality of groups of telephone units from the first system to the second system, the determining of the modified schedule performed via a reduction in a lowest calculated total penalty of a plurality of sequentially calculated total penalties as a result of sequential swaps of a time period assignment of a first group of telephone units with time period assignments of each other group of telephone units of the plurality of groups of telephone units.

8. The method of claim 1, wherein the at least one recursive neighborhood search comprises:
   automatically determining a modified schedule of the transfer of the plurality of groups of telephone units from the first system to the second system, the determining of the modified schedule performed via a reduction in a lowest calculated total penalty of a plurality of sequentially calculated total penalties as a result of sequential swaps of a predetermined unit from an assigned time period to any other available time period of the plurality of time periods.

9. The method of claim 1, further comprising:
   defining each unit of the plurality of groups of telephone units.

10. The method of claim 1, further comprising:
    defining a maximum number of telephone units assignable to each of the plurality of time periods.

11. The method of claim 1, further comprising:
    identifying each of the plurality of groups.

12. The method of claim 1, further comprising:
    terminating the at least one recursive neighborhood search after a predetermined count of recursive neighborhood searches.

13. The method of claim 1, further comprising:
    terminating the at least one recursive neighborhood search when a calculated total penalty is below a predetermined threshold.

14. The method of claim 1, further comprising:
    terminating the at least one recursive neighborhood search when a last recursive neighborhood search produces no improvement in a lowest calculated total penalty.

15. A machine-readable medium comprising machine instructions for activities comprising:
    automatically modifying a feasible schedule of a transfer of a plurality of groups of units from a first system to a second system, the modifying performed via at least one recursive neighborhood search the at least one recursive neighborhood search performed on the feasible schedule, the transfer of each of the plurality of groups of units scheduled during a corresponding time period of a plurality of predetermined time periods, the feasible schedule initially determined via iterative determinations of a next unit to be transferred, the next unit randomly chosen unit from a plurality of identified units, the plurality of identified units each having a determined value below a predetermined threshold, the determined value obtained from of an objective function f(u)–b(u),
    where:
    $f(u) = \Sigma_{v \in \Gamma, \{u\}} w_{u,v}$;
    $b(u) = \Sigma_{v \in V, \Gamma, \{u\}} w_{u,v}$;
    u is a unit;
    v is a unit;
    $w_{u,v}$ is a transfer penalty associated with transferring unit u in a first predetermined time period from the plurality of predetermined time periods and transferring unit v in second predetermined time period from the plurality of predetermined time periods;
    V is a set of all units; and
    Γ is a set of units yet to be scheduled.

* * * * *